(12) United States Patent
Perner

(10) Patent No.: US 7,895,141 B2
(45) Date of Patent: Feb. 22, 2011

(54) METHODS FOR CASE-BASED RECOGNITION OF HEP-2 CELLS IN DIGITAL IMAGES OF HEP-2 CELL SECTIONS

(76) Inventor: Petra Perner, Kurt-Eisner-Str. 81, Leipzig (DE) 04275

( * ) Notice: Subject to any disclaimer, the term of this patent is extended or adjusted under 35 U.S.C. 154(b) by 872 days.

(21) Appl. No.: 10/599,644

(22) PCT Filed: Aug. 16, 2004

(86) PCT No.: PCT/DE2004/001831

§ 371 (c)(1),
(2), (4) Date: Jul. 2, 2007

(87) PCT Pub. No.: WO2005/101291

PCT Pub. Date: Oct. 27, 2005

(65) Prior Publication Data

US 2008/0016015 A1 Jan. 17, 2008

(30) Foreign Application Priority Data

Apr. 8, 2004 (DE) ......................... 10 2004 018 172
Apr. 8, 2004 (DE) ......................... 10 2004 018 175

(51) Int. Cl.
*G06E 1/00* (2006.01)
*G06E 3/00* (2006.01)
*G06F 15/18* (2006.01)
*G06G 7/00* (2006.01)

(52) U.S. Cl. ......................................... 706/20

(58) Field of Classification Search ................. 411/344
See application file for complete search history.

(56) References Cited

U.S. PATENT DOCUMENTS 5,459,636 A   10/1995   Gee et al.
(Continued)

FOREIGN PATENT DOCUMENTS

DE           4211904 A1   11/1992
(Continued)

OTHER PUBLICATIONS

'Classification of HEp-2 cells using fluorescent image analysis and data mining': Perner, 2001, Medical data analysis, Springer, Incs 2199, 2001, pp. 219-224.*

(Continued)

*Primary Examiner*—Michael B. Holmes
*Assistant Examiner*—Peter Coughlan
(74) *Attorney, Agent, or Firm*—Gudrun E. Huckett

(57) ABSTRACT

The invention relates to methods for acquiring shapes from images with representations of HEp-2 cell sections in the form of objects and for learning abstract shape models from representations of HEp-2 cell sections for a case database for a case-based recognition of HEp-2 cells in digital images. The invention also relates to methods for acquiring shapes from images with representations of HEp-2 cell sections in the form of cases and for the case-based recognition of HEp-2 cells in the form of objects in digital images, to computer program products having a program code for carrying out these methods, to computer program products on machine-readable carriers for carrying out these methods, and to digital storage media that can interact with a programmable computer system whereby carrying out these methods. The methods are characterized in that individual shapes of HEp-2 cell sections are semiautomatically collected as objects in the form of representations in images and in that abstract shape models in different abstraction levels can be automatically obtained from these individual shapes. The learned abstract shape models are either averaged shapes from groups of groups of objects or medians in the form of individual groups of HEp-2 cells.

18 Claims, 3 Drawing Sheets

U.S. PATENT DOCUMENTS

| | | | |
|---|---|---|---|
| 5,911,002 | A | 6/1999 | Mitsuyama et al. |
| 6,246,785 | B1 | 6/2001 | Molnar et al. |
| 2003/0171873 | A1 | 9/2003 | Hoff |
| 2003/0208116 | A1* | 11/2003 | Liang et al. ............ 600/407 |

FOREIGN PATENT DOCUMENTS

| | | |
|---|---|---|
| DE | 19639884 A1 | 4/1997 |
| DE | 19616997 A1 | 10/1997 |
| DE | 19801400 A1 | 7/1999 |

OTHER PUBLICATIONS

'Image analysis and classification of HEp-2 cells in fluorescent images': Perner, 1998, IEEE 1051-4651, pp. 1677-1679.*

'Mining knowledge in medival image databases': Perner, 2000, SPIE vol. 4057, pp. 359-369.*

'Introduction to numerical methods': Stark, 1970, Macmillan Publishing, pp. 273-327.*

Petra Perner: Image Mining: issues, framework, a generic tool and its application to medical image diagnosis; Engineering Applications of Artificial Intelligence 15(2002) 205-216; Pergamon; XP-002308335; see international search report.

Petra Perner: Are case-based reasoning and dissimilarity-based classification two tides of the same coin? Engineering Applications of Artificial Intelligence 15 (2002) 193-203; Pergamon; XP-002308336.

Yoram Gdalyahu et al.: Flexible Syntactic Matching of Curves and Its Application to Automatic Hierarchical Classification of Silhouettes; IEEE Transactions on Pattern Analysis and Machine Intelligence, vol. 21, No. 12, Dec. 1999; XP-000931864; see international search report.

* cited by examiner

METHODS FOR CASE-BASED RECOGNITION OF HEP-2 CELLS IN DIGITAL IMAGES OF HEP-2 CELL SECTIONS

BACKGROUND OF THE INVENTION

The invention relates to methods for acquisition of shapes of images with representations of HEp-2 cell sections as objects and for learning abstract shape models from representations of HEp-2 cell sections for a case database for a case-based recognition of HEp-2 cells in the digital images; methods for acquisition of shapes of images with representations of HEp-2 cell sections as cases and for a case-based recognition of HEp-2 cells as objects in digital images; computer program products with a program code for performing these methods; computer program products on machine-readable carriers for performing these methods; and digital storage media that can interact with a programmable computer system in such a way such that these methods are carried out.

Arrangements for automatic examination of cells, cell complexes and other biological samples are disclosed, inter alia, in DE 196 16 997 A1 (method for automated microscope-supported examination of tissue samples or body fluid samples), DE 42 11 904 A1 (method and devices for providing a species list for a liquid sample), and DE 196 39 884 A1 (pattern recognition system).

According to DE 19616 997 A1, tissue samples or body fluid samples are examined with regard to cell types by application of a neuronal network.

Minute living beings such as worms, insects or snails are acquired and identified in DE 42 11 904 A1. The identification is done by comparison with objects contained in a reference object memory. At the same time, the identified objects are counted and inserted into a species list.

In DE 196 39 884 A1 solid components in a sample flow are acquired with regard to their size in particular in accordance with their projection length in the image along the X axis and the Y axis, their circumference, and their average color density. The diagnostics by means of immunofluorescence according to the principle of fluorescence-optical assay of autoantibody binding is performed on frozen sections of HEp-2 cells. This method provides the most reliable results and provides a safe basis for therapeutic decisions.

A disadvantage is the currently missing automation so that a high personnel expenditure is required in connection with a health-hazardous, time-consuming evaluation that requires much experience.

An automated method is disclosed in DE 198 01 400 C2 (method and arrangement for automated recognition, property description, and interpretation of HEp-2 cell patterns). In this connection, only the shapes in the images are recognized. Automated inference in regard to other cases is not provided.

SUMMARY OF THE INVENTION

The present invention is based on the object of obtaining abstract shape models from images representing HEp-2 cell sections for a case database as well as of being able to determine objects automatically from digital images with objects by comparison with cases.

This object is solved by means of the features listed in the independent claims.

The method for acquisition of shapes from images containing representations of HEp-2 cell sections with HEp-2 cells as objects and for learning abstract shape models of HEp-2 cells for a case database for the purpose of a case-based recognition of HEp-2 cells in digital images are distinguished in particular in that semi-automatically individual shapes of HEp-2 cell sections as objects are acquired in the form of representations in images and in that automatically, based on these individual shapes, abstract shape models in different abstract levels can be determined. The learned abstract shape models are either averaged shapes of groups of objects or medians as individual shapes of groups of HEp-2 cells. The median is the object from which all other objects have the smallest spacing. The median is thereof a natural shape of an HEp-2 cell while the averaged shape is an artificial object that is not actually present.

The special advantage resides in that the contour or the shape is digitally detected and is saved in a datafile. Based on the data, subsequently manipulations can be carried out wherein, for example, similarity parameters can be determined and the similarity becomes describable.

Accordingly, this method is suitable for creating case databases with shape models of HEp-2 cells. Advantageously, groups of shapes of HEp-2 cells can be automatically generated and the similarities relative to one another can be hierarchically determined. From these groups, models of different abstraction levels can be determined moreover.

The basis are digital images with representations of HEp-2 cell sections with different appearance shapes with regard to contour and/or texture. By manually tracing edges that form contours and/or textures of an image by means of a hand-held input device connected to a computer, data are acquired that can be correlated with these edges and the thus represented HEp-2 cells as objects. Based on these data, shape models can be obtained in order to acquire knowledge in regard to the objects. In this way, the case database can be expanded advantageously.

In this connection, at least two HEp-2 cells are compared with one another, respectively, and are oriented toward one another and scaling and/or rotation is carried out.

Advantageously, at the same time the similarity is calculated wherein similarity parameters are acquired either as distance values or similarity values between the objects until either a minimum of the distance values or a maximum of the similarity values is present.

Groups with similar shape models of HEp-2 cells can be learned or similar groups of HEp-2 cells can be combined wherein similarity relations can be generated as a comparison between these groups.

A further advantage resides in that with the application of the method, new shape models of HEp-2 cells of HEp-2 cell sections as objects in digital images can be also continuously correlated with the case database. In this way, an expansion of the case database is provided.

In this way, it is possible to generate a case database for automatic recognition, property description, and interpretation of HEp-2 cells in HEp-2 cell sections that serve for detection of autoimmune diseases. Autoimmune diseases are diseases that are characterized by a reactivity of the immune system against the body's own substances and structures. A common phenomenon in the case of autoimmune diseases is the occurrence of autoantibodies. The latter are immunoglobulins that are targeting the body's own structures. In addition to organ-specific autoantibodies, in particular, antibodies that are not organ-specific with reactivity against cellular structures are of importance. The detection of such autoantibodies is of great diagnostic importance.

For characterizing the specificity of autoantibodies, it is examined against which target antigens they are directed. This is possible with several methods. One of them is diagnostics by means of immunofluorescence. The latter is carried out on HEp-2 cells wherein the most reliable results are obtained. At the same time, it represents a safe basis for therapeutic decisions.

The case database for automatic recognition, property description, and interpretation of HEp-2 cells in HEp-2 cell sections are used for the detection of autoimmune diseases. Autoimmune diseases are diseases that are characterized by a reactivity of the immune system against the body's own substances and structures. A common phenomenon in the case of autoimmune diseases is the occurrence of autoantibodies. The latter are immunoglobulins that are targeting the body's own structures. In addition to organ-specific autoantibodies, in particular, antibodies that are not organ-specific with reactivity against cellular structures are of importance. The detection of such autoantibodies is of great diagnostic importance.

For characterizing the specificity of autoantibodies, it is examined against which target antigens the autoantibodies are directed. This is possible with several methods. One of them is diagnostics by means of immunofluorescence. The latter is carried out on HEp-2 cells wherein the most reliable results are obtained. At the same time, it represents a safe basis for therapeutic decisions.

The case database thus is the basis for automated case-based recognition and determination of HEp-2 cells in HEp-2 cell sections as objects in digital images with objects.

The selected case image and the generated gradient image of the digital image with objects is transformed into pyramids with image planes. The individual image planes are compared sequentially with one another wherein the highest image planes are used first. The highest image planes are the least sharp image planes with the least amount of data, respectively, so that the comparison is carried out beginning with the least computing expenditure. Furthermore, the selected case image is compared successively with every object of the digital image with objects. During the comparison between each object image and each case image, an orientation and scaling and/or rotation of the case image is carried out wherein at same time the similarity is calculated.

The special advantage resides in that either the contour or the shape can be digitally detected and saved in a data file. With this data, subsequently manipulations can be carried out wherein, for example, similarity parameters can be determined and the similarity and/or the similarity as a degree of matching between the case image and object image are describable by the similarity parameter. With decreasing similarity parameter, the object image becomes less similar to the case image.

The methods according to the invention can be advantageously made available to the users as computer program products with a program code, respectively, for performing this method, as computer program products on machine-readable carriers for performing these methods, and as digital storage media that can cooperate with a programmable computer system.

Advantageously, the distance values and/or similarity values provide a distance matrix or similarity matrix.

The distance values or the similarity values are advantageously hierarchically represented by means of single linkage method and a dendogram.

According to another embodiment, at least two cases are compared with one another, respectively, wherein the cases are oriented toward one another and scaling and/or rotation is carried out. Advantageously, at the same time the similarity is calculated, wherein similarity parameters are determined either as distance values or similarity values between the cases, respectively, until either a minimum of the distance values or a maximum of the similarity values is present.

Advantageously, the dendogram on the similarity scale is intersected at least once according to either determined, and thus automatic, or user-specific thresholds so that groups will be generated. The individual shapes are correlated with the groups and within the groups a prototype is selected, wherein the prototype is either an averaged shape that is averaged based on the individual shapes of the group or the median of the group of individual shapes. In this way, a visual control of individual groups and/or the individual objects is provided. The averaged shape or the median of the group is represented on the data viewing device and its contour points are saved as a data set in the computer.

In accordance the another embodiment, advantageously a reduction of the data obtained by tracing the edges and thus of the points as the visible outer and/or inner contours is done by interrelation with a polynomial.

The cases correlated with the scanned edges are advantageously transformed in such that the center point of a case corresponds to the coordinate origin 0, 0. The cases are aligned within a coordinate system so that a comparison with regard to their similarities relative to one another is possible easily.

The calculation of the similarities is based on the determination of similarity parameters. In this connection, at least one case and one object are compared with one another wherein they are oriented toward one another and scaling and/or rotation is carried out. At the same time, the similarity is calculated wherein similarity parameters are determined either as distance values or similarity values between the case and the object, respectively, until either a minimum of the distance values or a maximum of the similarity values is present.

Advantageously, a gradient image is generated by means of edge detection of the objects of the digital image wherein gradients are assigned to large changes of the grayscale in vertical direction as well as in horizontal direction while no gradients are assigned to homogenous surfaces. The homogenous surfaces are black. The result is an image with white edges of the object while the surfaces enclosed by the edges of the objects and the surfaces adjoining the edges of the object are black. The data set of the digital image is thus significantly reduced in comparison to a grayscale image of the digital image. At the same time, the computation expenditure is reduced for comparing each object with the selected case by the calculation of the similarities with the determination of the similarity parameters. Moreover, stacked and partially overlapping objects in the digital image can be more easily determined by comparison with a selected case.

According to another embodiment, a gradient image is generated based on the case image as well as the object image, respectively, and the gradient images each are transformed into an image sequence as a pyramid with image planes, wherein successively the directional vectors in the image planes of the case image and the object image, respectively, are compared with one another by forming the product. The principle of pyramids reduces the computational expenditure significantly. The respective subsequent image planes of the pyramids are representations of a raster that is twice as coarse. For this purpose, only every other point of a line and only every other line are picked and combined to a new image as an image plane. The employed tracing theorem ensures at the same time that the original finer raster can be exactly reconstructed based on the coarser raster. When comparing the cases and the object, one starts advantageously with the coarsest raster of the uppermost image planes. Depending on the result of the comparison of the similarity, successively image planes are compared with one another with the finer raster, respectively. The comparison can be interrupted at any time so that the computational expenditure for the comparison can be reduced significantly.

According to a further embodiment, a dendogram represents an advantageous differentiation means of individual cases wherein groups of individual cases are hierarchically ordered. In this connection, the case image is a prototype of a group of individual cases wherein the groups are sets of similar individual cases with certain distance values or similarity values. The most similar case determines the branch of the dendogram with similar cases for determination of the object. The prototype is either an averaged shape averaged from the individual shapes of the group or the median of the group of individual shapes. The median is the case from which all other cases have the smallest spacing. The median represents thus a natural HEp-2 cell while the averaged shape is an artificial HEp-2 cell. However, the case image can also be an individual image of an object.

By means of determining the directional vector between either two points or neighboring points of the edges either in the case image or in the object image, the direction of the edge as a local orientation is determined so that the components of the course of direction of the local orientation and of the expression, measured e.g. based on the height or the slant of the edge, are incorporated into description of the edge. In this way, advantageously also the surroundings of the existing complex structure of the image information can be incorporated into the calculation of the similarities. In the calculation of similarities, the similarity parameters are thus determined as directional vectors as well as distance values or similarity values between the case image and the object image. Additional information of the digital image is thus advantageously also considered when comparing by means of calculation of similarity.

According to a further embodiment, either the prototypes or the cases are ordered by means of an index in accordance with the similarity relations in the case database. The index characterizes an index register with the prototypes and/or the cases individually or in groups wherein from a set of prototypes and/or cases the most similar prototype or case in comparison to the object in the image can be found quickly.

The calculation of similarity is realized advantageously according to the following formula.

$$D(P, O) = \sum_{i=1}^{N} \left| \frac{(p_i - \mu_p)}{\delta_p} - R(\Theta)\frac{(o_i - \mu_o)}{\delta_o} \right|^2$$

wherein
P and O—the objects
$\Theta$—the rotation matrix,
$\mu_p$ and $\mu_o$—the center points of the objects P and O, and
$\delta_p$ and $\delta_o$—the sums of the squared spacings of each point from the center points.

Another embodiment advantageously provides that a non-identical object can be determined as a case manually and assigned to the dendogram with the determined cases. In this way, the case database can be expanded continuously.

BRIEF DESCRIPTION OF THE DRAWINGS

Embodiments of the invention will be explained in more detail in the following with the aid of the illustrations.

It is shown in.

DESCRIPTION OF PREFERRED EMBODIMENTS

A method for acquisition of shapes of digital images of HEp-2 cell sections with HEp-2 cells as objects and for learning abstract shape models of HEp-2 cells for a case database for case-based recognition of HEp-2 cells in digital images will be explained in more detail as an example of the invention in a first embodiment. In this context, HEp stands for human epithelium.

On a data viewing device in the form of a known monitor connected to a computing device such as a computer a digital image of an HEp-2 cell section is represented whose contours can be different.

Figure 1:
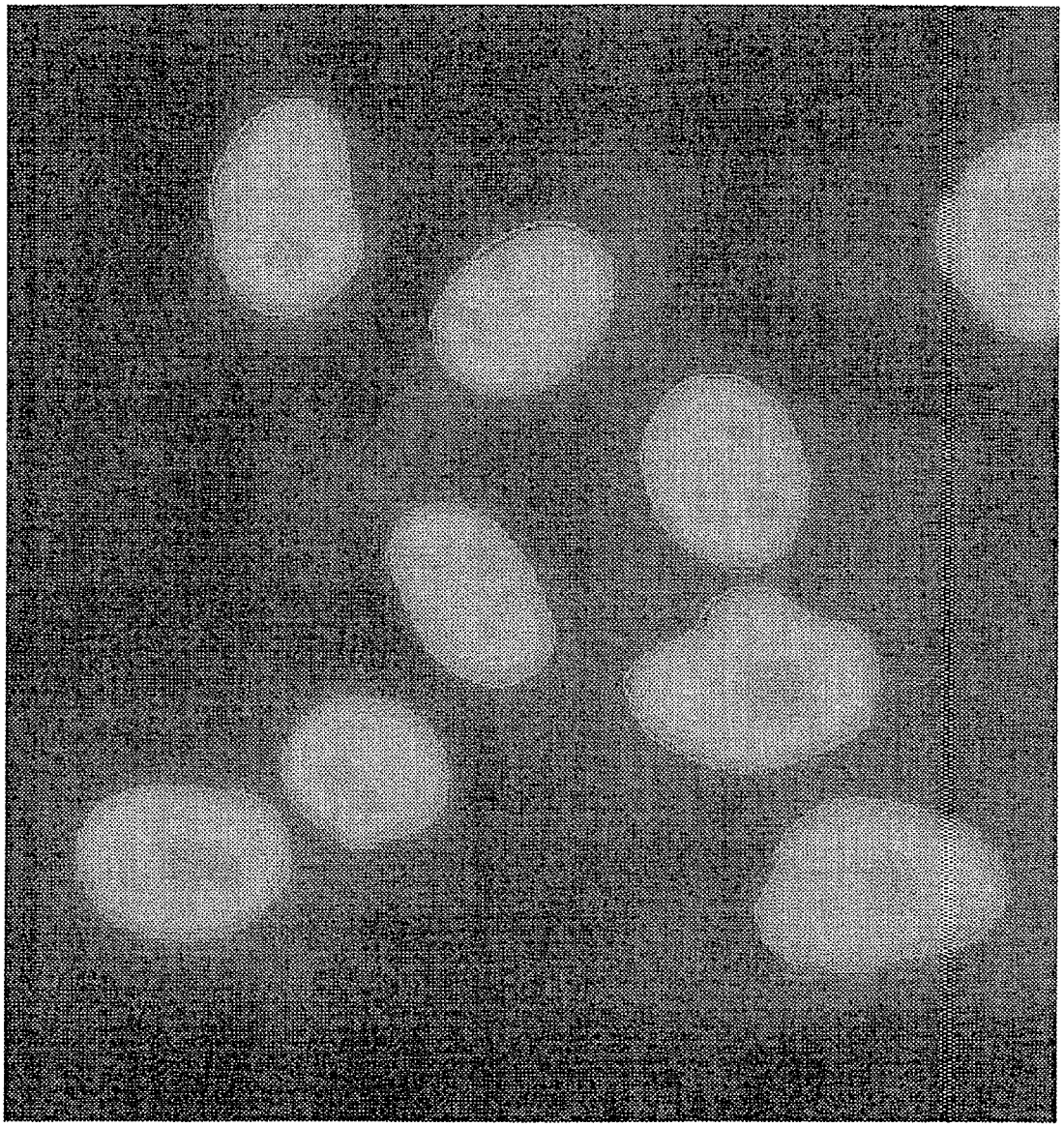
FIG. 1 an illustration with labeled and approximated contours of sectioned HEp-2 cells.

FIG. 1 shows an illustration with labeled and approximated contours of sectioned HEp-2 cells.

By manual tracing of edges of the digital image with a handheld input device in connection with the data viewing device, data is acquired that can be correlated with the scanned edges. Edges are in this connection visible outer and/or inner contours of represented sectioned HEp-2 cells as objects.

By means of the handheld input devices in the form of the cursor of the monitor guided by a keyboard or a mouse, a light pen with a photodetector, a scanner and/or a pen and scanner in cooperation with the data viewing device, data of the contour points as X-coordinate, Y-coordinate and/or grayscale values or color values of the contour points are acquired as data of the edges of HEp-2 cells assignable to the objects. A further embodiment is provided by a combination of a pen in connection with a touchscreen. Such input devices and the method for obtaining the data correlated with the edges are known so that no further explanation is needed.

Tracing of the contours is done manually by means of the handheld input device on a digital image represented on a data viewing device. The traced contours can also be represented with labels by means of the data viewing device wherein this is represented as an area field at least partially by the scanned contour and/or edge on the data viewing device. In this way, easy control of the traced edges is possible on the data viewing device. Errors that are caused, for example, by lack of concentration, disruptions, distractions, or fatigue of the persons tracing the contours and/or edges of the cases are prevented.

Each of the HEp-2 cells as objects determined by the edges is scaled in a coordinate system wherein the center point of the object corresponds to the coordinate origin X=0 and Y=0.

The similarity of sectioned HEp-2 cells is determined by paired orientation relative to one another, respectively, until the similarity parameter no longer changes. Scaling and/or rotation is performed wherein at the same time the similarities are calculated. During calculation of the similarity the similarity parameters are determined either as distance values or as similarity values between the objects, respectively, until either a minimum of the distance values or a maximum of the similarity values is present. The calculation of similarity is done in accordance with $$D(P, O) = \sum_{i=1}^{N} \left| \frac{(p_i - \mu_p)}{\delta_p} - R(\Theta)\frac{(o_i - \mu_o)}{\delta_o} \right|^2$$

wherein
P and O—the objects
Θ—the rotation matrix,
$\mu_p$ and $\mu_o$—the center points of the objects P and O, and
$\delta_p$ and $\delta_o$—the sums of the squared spacings of each point from the center points.

The distance values or the similarity values define a distance matrix or a similarity matrix.

Figure 2:
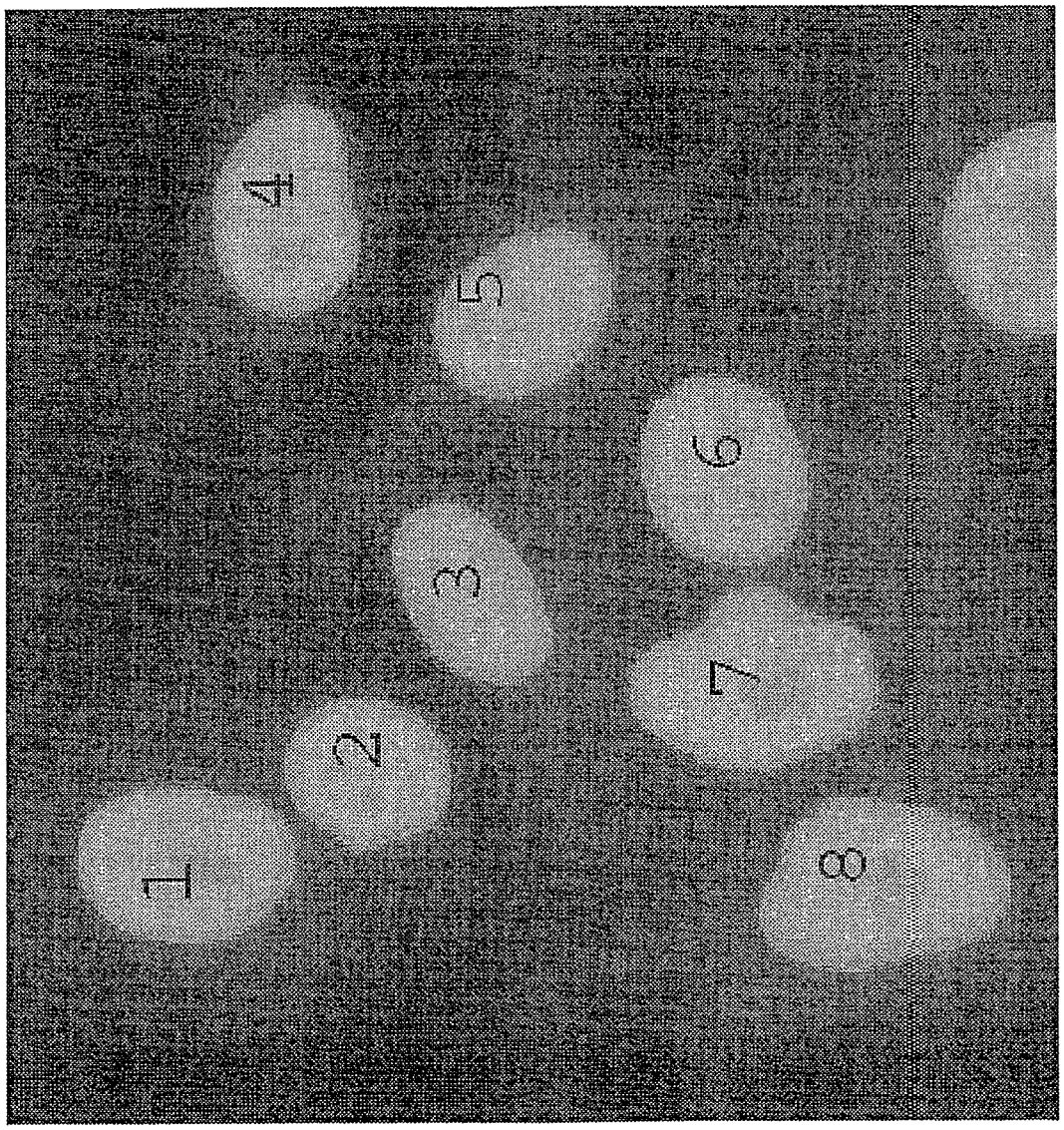
FIG. 2 the illustration with numbered representations of the sectioned HEp-2 cells of FIG. 1.
Figure 3:
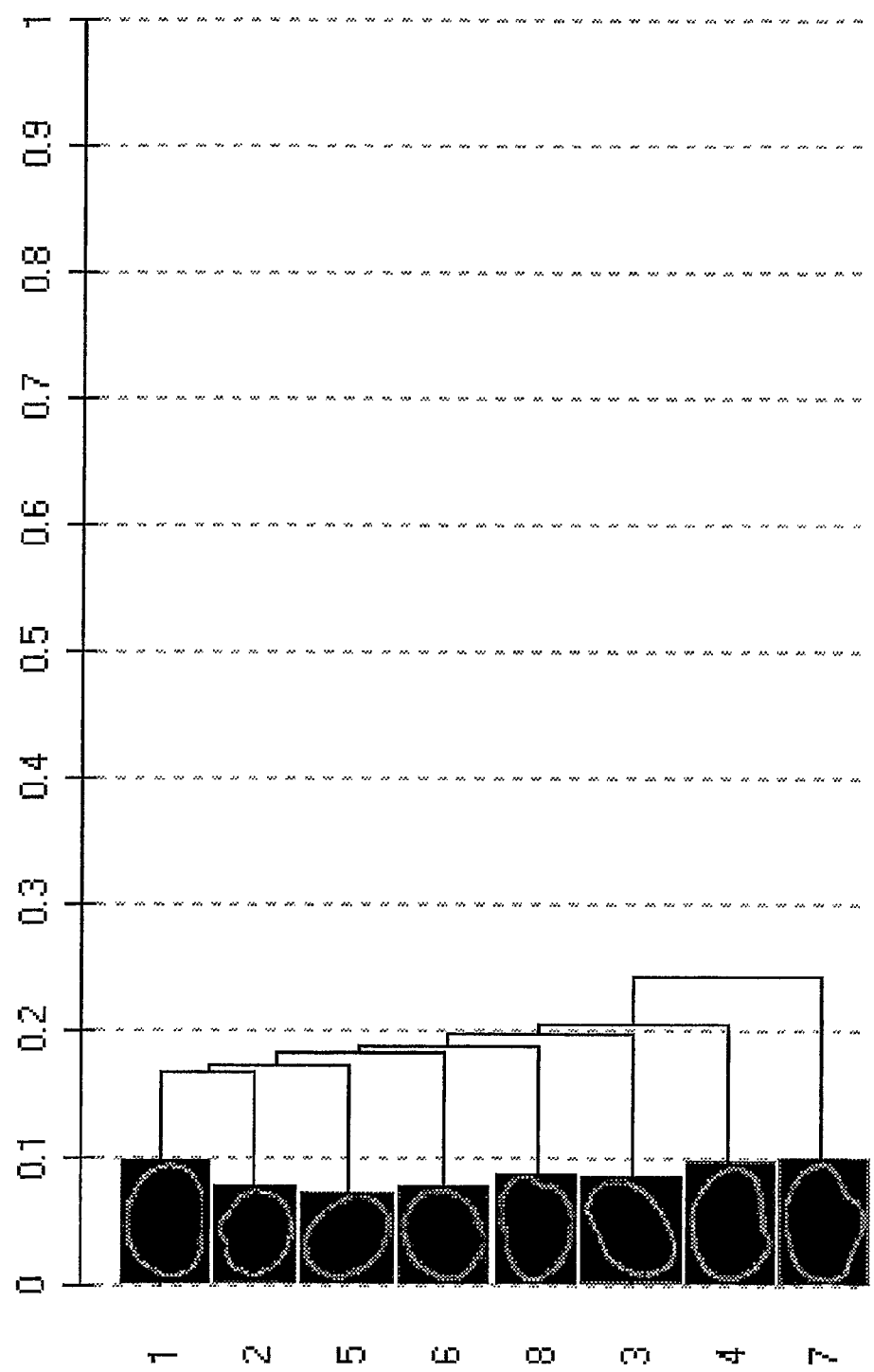
FIG. 3 a dendogram of these HEp-2 cells.

Based on the determined similarity values, sets of similar objects are formed and are ordered hierarchically as a dendogram. FIG. 2 shows numbered illustrations of the sectioned HEp-2 cells of FIG. 1. The dendogram is intersected with the similarity scale in accordance either with fixed or user-specific thresholds so that groups will result. In the case of fixed thresholds, the dendogram is intersected automatically. The individual shapes are assigned to the groups and a prototype is selected within the groups, respectively. The prototype is either an averaged shape which is averaged from the individual shapes of the group or the median of the group of the individual shapes. The prototype of the group is represented on the data viewing device and the contour points of the prototypes are saved as data sets in the computer. FIG. 3 shows a dendogram of this HEp-2 cell section.

This method is employed on further digital images so that a case database with shape models as prototypes with averaged shapes of groups of individual shapes and/or with mediums of groups of individual shapes will result.

In one variant of the embodiment the data of edges of visible outer and/or inner contours in the digital image, acquired by means of the input device in connection with the data viewing device, are reduced by interpolation. According to this interpolation:

in a first step, the starting point is assigned to a first point of the edge of the object which first point is determined by the coordinate system and therefore scaled;

in a second step, a virtual line to a neighboring point as the second point is drawn;

in a third step, the distance between this virtual line and the corresponding segment of the contour of a preceding object is determined, in a fourth step, this spacing is compared as a value with a preset value; and in a fifth step, a starting point for a virtual line to the next point is assigned to the second point.

The steps 3, 4, and 5 are repeated for the entire contour of the object.

The distance values or similarity values can be advantageously hierarchically represented in accordance with a further embodiment by means of single linkage method and a dendogram.

A method for acquisition of shapes of digital images of HEp-2 cells sections with HEp-2 cells as objects and for learning abstract shape models of HEp-2 cells will be explained in more detail as one example of the invention in a second embodiment.

The case database with cases as case images, determined by a method for acquisition of shapes of digital images of HEp-2-cell sections with HEp-2 cells as objects and for learning abstract shape models of HEp-2 cells of the first embodiment, form the basis for a case-based recognition of HEp-2 cells as objects in digital images with objects.

A case image with a case description is selected from the case database. The case image is either a prototype of a group of individual cases or an individual image of a case. The group of individual cases represent sets of similar individual cases with certain distance values or similarity values that are ordered hierarchically as a dendogram. The most similar case determines the branch of the dendogram. The prototype itself is either an averaged shape determined based on the individual shapes of the group or the median of the group of individual shapes. The case image is transformed into an image sequence as a pyramid with image planes of the case image. An image sequence as a pyramid with image planes prevents an explosive growth of the computation expenditure. The case image can be represented sequentially on a raster that is twice as coarse without any loss of information by application of smoothing operations, wherein all wave numbers remain below half the limit wave number, and based on the tracing theorem. In this connection only every other point of the line and only every other line are picked and combined to a new image wherein it is ensured that the original finer raster can be exactly reconstructed from the coarser raster. The application of the smoothing operations is done iteratively so that based thereon a sequence of images results wherein the images with regard to their surface area become smaller by the factor 4. The image planes that become smaller and smaller result in the shape of a pyramid when stacked.

Based on the actual digital image with sectioned HEp-2 cells as objects a gradient image is generated. By means of edge detection of the objects of the digital image comprising objects the gradient image is generated wherein gradients will be assigned to large changes of the grayscale value in the vertical direction as well as horizontal direction and no gradients will be assigned to homogenous surfaces. The homogenous surfaces are thus black. The gradient image is transformed also into an image sequence as a pyramid with image planes.

The case image is subsequently successively moved onto each object image of the gradient image beginning with the highest image plane of the case image and the object image wherein the case image is compared with each object image of the gradient image. During comparison, the case image is oriented toward the object image wherein in this connection scaling and/or rotation of the case image is done. When comparing the case image with the object image the similarity between the case image and object image is calculated at the same time. In the calculation of similarity, the similarity parameters are determined either as distance values or similarity values between the case image and the object image, respectively, until either a minimum of the distance values or a maximum of the similarity values is present. The similarity parameters determine the degree of similarity between the case image and object image wherein the degree of similarity decreases with decreasing similarity parameter and the object image becomes less similar to the case image.

In a further embodiment, the directional vector between either two points or neighboring points of the edges either has been calculated for the case image or will be calculated for the object image. When calculating the similarity, the similarity parameters as well as the directional vectors as well as either distance values or similarity values between the case image and the object image are determined.

The HEp-2 cells as cases are ordered by means of an index in accordance with the similarity relations in such a way in the case database that either the most similar prototype from a set of prototypes or the most similar case from a set of cases can be found quickly for the object in the image.

The prototype either as an averaged shape or median of the group or the individual image is represented on a data viewing device in the form of a monitor connected to a computer in which the method is performed. Moreover, the contour points either of the averaged shape or the median or the individual image are saved as a data set in the computer.

In a further variant of the embodiment a gradient image is formed from the case image and the object image, respectively. These gradient images are transformed, respectively, into an image sequence as a pyramid with image planes and, successively, the directional vectors in the image plans of the case image and the object image, respectively, are compared with one another by forming the product.

A third embodiment is a computer program product with a program code for performing either a method disclosed in the first embodiment for acquisition of shapes from digital images with representations of HEp-2 cell sections and for learning abstract shape models of the represented HEp-2 cells or a method disclosed in the second embodiment for acquisition of shapes of images with representations of HEp-2 cell sections as cases and for case-based recognition of HEp-2 cells as objects in the digital images, when the program is run on a computer.

The fourth embodiment is a computer program product on the machine-readable carrier for performing either a method disclosed in the first embodiment for acquisition of shapes from digital images with representations of HEp-2 cells and for learning abstract shape models from representations of HEp-2 cell sections or a method disclosed in the second embodiment for acquisition of shapes of images with representations of HEp-2 cell sections as cases and for case-based recognition of HEp-2 cells as objects in the digital images, when the program is run on a computer.

A fifth embodiment is a digital storage medium that interacts with a programmable computer system such that either a method disclosed in the first embodiment for acquisition of shapes from digital images with representations of HEp-2 cells and for learning abstract shape models from representations of HEp-2 cell sections or a method disclosed in the second embodiment for acquisition of shapes from images with representations of HEp-2 cell sections as cases and for case-based recognition of HEp-2 cells as objects in the digital images, is carried out.

What is claimed is:

1. A method for a case-based recognition of HEp-2 cells in digital images of HEp-2 cell sections, comprising:

acquiring data for each image by manual tracing of edges of an image in the form of visible outer and/or inner contours of HEp-2 cells by means of a hand-held input device connected to a computer, wherein the data can be correlated with these edges and the HEp-2 cells as objects represented thereby;

eliminating a translation of each object such that each object is moved into the origin of a coordinate system;

scaling each object in accordance with the correlated data within the coordinate system;

comparing at least two objects with one another, respectively, wherein the objects are oriented toward one another, wherein for comparing scaling and/or rotation is carried out;

calculating at the same time a similarity based on $$D(P, O) = \sum_{i=1}^{N} \left| \frac{(p_i - \mu_p)}{\delta_p} - R(\Theta)\frac{(o_i - \mu_o)}{\delta_o} \right|^2$$

P, O—objects
    $\Theta$—rotation matrix
    $\mu_p$ and $\mu_o$—center points of the objects P and O
    $\delta_p$ and $\delta_o$—the sums of the squared spacings of each point from the center points;

during calculation of the similarity, determining similarity parameters either as distance values or similarity values between the objects, respectively, until either a minimum of the distance values or a maximum of the similarity values is present;

based on the determined distance values or similarity values, forming sets of similar objects and hierarchically ordering the sets as a dendogram; and dividing the dendogram by presetting distance values or similarity values into groups and selecting within the groups one prototype, respectively, wherein the prototype either is an averaged shape averaged based on individual shapes of the group or the median of the group of the individual shapes.

2. The method according to claim 1, wherein the distance values or the similarity values define a distance matrix or a similarity matrix.

3. The method according to claim 1, representing the distance values or the similarity values hierarchically by means of the single linkage method and a dendogram.

4. The method according to claim 1, comprising:

intersecting the dendogram once on the similarity scale in accordance with either at least one fixed, and thus automatic, or at least one user-specific threshold so that groups result;

correlating the individual forms with the groups;

in the groups, selecting one prototype, respectively, wherein the prototype is either an averaged shape that is averaged based on the individual shapes of the group or the median of the group of the individual shapes;

representing the averaged shape or the median of group on a data viewing device; and saving the contour points of the averaged shape or the median as a data set in the computer.

5. The method according to claim 1, wherein a reduction of the data acquired by tracing the edges and thus of the points as the visible outer and/or inner contours is realized by interpolation with a polynomial.

6. The method according to claim 1, standardizing the data of the objects such that the center point of the object corresponds to the coordinate origin 0, 0.

7. The method according to claim 1, comprising:

ordering the cases in the case database by an index in accordance with the similarity relations such that from a set of prototypes the most similar prototype or from a set of cases the most similar case can be found quickly for the object in the image.

8. The method according to claim 1, wherein for acquisition of shapes from images with cases and for learning abstract shape models based on these cases for a case database, for each image with cases;

data are acquired by manual tracing of edges of an image in the form of visible outer and/or inner contours with a handheld input device connected to a computer which data can be correlated with these edges and thus cases;

at least two cases are compared with one another, respectively, by means of moving and scaling for each case;

the two cases are oriented toward one another and in this connection at the same time the similarity is calculated by determination of similarity parameters;

in accordance with the similarity parameters, sets of similar cases are formed and ordered hierarchically as a dendogram;

the dendogram, by presetting distance values or similarity values, is divided into groups and within the groups a prototype is selected;

for recognition of an object in a digital image with objects from the case database a case is selected as a case image with a case description, wherein at the same time:

an image sequence is generated of the case image as a pyramid with image planes;

a gradient image of the actual digital image is generated and is transformed into an image sequence as a pyramid with image planes;

the case image is successively moved onto each object image of the gradient image beginning with the highest image planes, wherein the case image is compared to each object image of the gradient image and at the same time a similarity is calculated by determination of similarity parameters, and the degree of similarity between case image and object image is determined by the similarity parameter.

9. The method according to claim 8, wherein a translation of each case is eliminated by:

moving each case into the origin of a coordinate system;

scaling each case in accordance with the correlated data within the coordinate system;

comparing at least two cases with one another, respectively;

orienting the cases toward one another, wherein scaling and/or rotation is performed;

at the same time calculating the similarity and determining the similarity parameters either as distance values or similarity values between the cases, respectively, until either a minimum of the distance values or a maximum of the similarity values is present;

based on the determined distance values or similarity values, forming sets of similar cases and hierarchically ordering the sets as a dendogram dividing the dendogram by presetting distance values or similarity values into groups and selecting within the groups a prototype, respectively, wherein the prototype is either an averaged shape that is averaged based on the individual shapes of the group or the median of the group of the individual shapes.

10. The method according to claim 9, wherein the degree of similarity and thus the identity between case image and object image is determined by the similarity parameter and represents a threshold value, wherein a non-identical object relative to the case is either refused or is represented as a case on the data viewing device so that, by manual determination and by manual tracing of edges in the form of visible outer and/or inner contours with the hand-held input device connected to the computer, data are acquired that can be correlated with these edges and thus the case and can be correlated with the dendogram with the determined cases.

11. The method according to claim 8, comprising:

selecting a case image with a case description from the case database;

subsequently or simultaneously generating an image sequence from the case image as a pyramid with image planes;

generating a gradient image of the actual digital image and transforming the gradient image into an image sequence as a pyramid with image planes;

moving the case image successively onto each object image of the gradient image beginning with the highest image planes, wherein the case image is compared with each object image of the gradient image, the case image is oriented toward the object image and scaling and/or rotation of the case image is carried out at the same time calculating the similarity and determining the similarity parameters either as distance values or similarity values between the case image and the object image, respectively, until either a minimum of the distance values or a maximum of the similarity values is present; and determining the degree of similarity between case image and object image by the similarity parameter such that the degree of similarity decreases with decreasing similarity parameter and the object image becomes less similar to the case image.

12. The method according to claim 11, comprising:

generating by means of an edge detection of the objects of the digital image the gradient image;

correlating gradients with large changes of the grayscale value in the vertical direction as well as in the horizontal direction, respectively, wherein no gradient is correlated with homogenous surfaces so that the homogenous surfaces are black.

13. The method according to claim 8, comprising:

forming a gradient image based on the case image as well as the object image, respectively;

transforming these gradient images each into an image sequence as a pyramid with image planes; and successively comparing the directional vectors in the image planes of the case image and the object image with one another by forming the product.

14. The method according to claim 8, wherein the case image is a prototype of the individual shapes of a group of either averaged shape or the median of the group of individual cases, wherein groups are sets of similar individual cases ordered as a dendogram with determined distance values or similarity values and the most similar case determines the branch of the dendogram or that the case image is an individual image of a case.

15. The method according to claim 8, comprising:

calculating the directional vector between either two points or neighboring points of the edges for the case image or for the object image;

during the calculation of the similarity, determining the similarity parameters as directional vectors as well as either as distance values or similarity values between the case image and the object image, respectively.

16. A computer program product with a program code stored on a digital storage medium for performing the method of claim 1 for a case-based recognition of HEp-2 cells in digital images of HEp-2 cell sections, when the program is running on a computer.

17. A computer program product with a machine-readable digital storage medium for performing the method of claim 1 for a case-based recognition of HEp-2 cells in digital images of HEp-2 cell sections, when the program is running on a computer.

18. A digital storage medium that can interact with a programmable computer system such that the method of claim 1 for a case-based recognition of HEp-2 cells in digital images of HEp-2 cell sections is carried out.

* * * * *